(12) United States Patent
Watanabe et al.

(10) Patent No.: US 7,570,915 B2
(45) Date of Patent: Aug. 4, 2009

(54) ANTENNA UNIT EQUIPPED WITH A TUNER PORTION

(75) Inventors: Takeo Watanabe, Novi, MI (US); Yasuyuki Honma, Tokyo (JP); Takumi Suzuki, Akita (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 567 days.

(21) Appl. No.: 11/214,491

(22) Filed: Aug. 30, 2005

(65) Prior Publication Data

US 2006/0174299 A1     Aug. 3, 2006

(51) Int. Cl.
*H04H 20/74*      (2008.01)

(52) U.S. Cl. ............... 455/3.02; 455/193.1; 455/193.2; 755/100

(58) Field of Classification Search .............. 455/3.02, 455/193.1, 193.2; 755/100
See application file for complete search history.

(56) References Cited

U.S. PATENT DOCUMENTS

| | | | | |
|---|---|---|---|---|
| 5,341,397 | A | * | 8/1994 | Gudmundson ............... 370/335 |
| 5,845,092 | A | * | 12/1998 | Hsieh ........................ 704/248 |
| 5,854,969 | A | | 12/1998 | Gullner |
| 6,775,714 | B1 | * | 8/2004 | Miyano ........................ 710/8 |
| 6,934,512 | B2 | * | 8/2005 | Meirzon et al. |
| 2002/0193077 | A1 | * | 12/2002 | Sakurai et al. ............. 455/67.7 |
| 2002/0198024 | A1 | * | 12/2002 | Sakurai ...................... 455/558 |
| 2005/0002641 | A1 | * | 1/2005 | Takagi |
| 2005/0140790 | A1 | * | 6/2005 | Min et al. ............... 348/207.99 |

FOREIGN PATENT DOCUMENTS

| | | |
|---|---|---|
| JP | 09-502062 T | 2/1997 |
| JP | 10-164108 A | 6/1998 |
| JP | 11-041533 A | 2/1999 |
| JP | 2001-024428 A | 1/2001 |
| JP | 2001-136447 A | 5/2001 |
| JP | 2001-144634 A | 5/2001 |

OTHER PUBLICATIONS

Japanese Office Action dated May 7, 2009 (2 pages), and English translation thereof (1 page), issued in a counterpart Japanese Application Serial No. 2005-020537.

* cited by examiner

*Primary Examiner*—Matthew D Anderson
*Assistant Examiner*—Adel Youssef
(74) *Attorney, Agent, or Firm*—Frishauf, Holtz, Goodman & Chick, P.C.

(57) ABSTRACT

An antenna unit equipped with a satellite radio tuner and a tuner-unequipped head unit are connected to each other through a serial bus cable. Equipped in the antenna unit, the satellite radio tuner has a tuner portion, a digital demodulating portion, an interface portion, and a CPU. The interface portion serves as a speech/serial converting portion for converting a digital speech signal into a serial signal. The head unit includes an interface portion for receiving the serial signal sent from the antenna unit through a serial bus cable. The interface portion serves as a serial/speech converting portion for converting the received serial signal into the speech signal.

4 Claims, 11 Drawing Sheets

ANTENNA UNIT EQUIPPED WITH A TUNER PORTION

This application claims priority to prior Japanese patent application JP 2005-20537, the disclosure of which is incorporated herein by reference.

BACKGROUND OF THE INVENTION

This invention relates to an antenna unit for use in receiving an electric wave of a digital radio broadcasting and a receiving system therefore.

In recent years, a digital radio receiver, which receives a satellite wave or a terrestrial wave to listen the digital radio broadcasting, has been developed and is put to practical use in the United State of America. The digital radio receiver is mounted on a mobile station such as an automobile and can receive an electric wave having a frequency of about 2.3 gigahertz (GHz) to listen in a radio broadcasting. That is, the digital radio receiver is a radio receiver which can listen in a mobile broadcasting. Inasmuch as the received wave has the frequency of about 2.3 GHz, a reception wavelength (resonance wavelength) $\lambda$ thereof is equal to about 128.3 mm. In addition, the terrestrial wave is an electric wave in which a signal where the satellite wave is received in an earth station is frequency shifted a little.

Inasmuch as the electric wave having the frequency of about 2.3 GHz is used in the digital radio broadcasting in the manner which is described above, it is necessary to set up an antenna outside the automobile. Accordingly, the antenna must be attached to a roof of the automobile in a case where the digital radio receiver is mounted in the automobile.

Such as an antenna for the automobile and a receiver body (a head unit) put inside a room of the automobile are electrically connected to each other through a cable. The head unit serves as an external device.

A receiving system of the type described for receiving the satellite wave of the terrestrial wave includes an antenna portion (an antenna unit) and a tuner portion (a satellite radio tuner). The antenna portion (the antenna unit) receives the satellite wave or the terrestrial wave to produce a received signal having a high frequency. The tuner portion (the satellite radio tuner) demodulates the received signal into a speech signal.

In conventional receiving systems, the antenna portion (the antenna unit) and the tuner portion (the satellite radio tuner) are constructed in a separated state each other. In other words, a conventional antenna unit comprises an antenna element for receiving the satellite wave or the terrestrial wave and a low noise amplifier (LNA) for amplifying an electric wave received by the antenna element to produce a received signal.

On the other hand, head units are classified into a tuner-equipped head unit equipped with a satellite radio tuner and a tuner-unequipped head unit equipped with no satellite radio tuner.

First and second conventional receiving systems are known in the art. The first conventional receiving system uses, as the head unit, the tuner-equipped head unit while the second conventional receiving unit uses, as the head unit, the tuner-unequipped head unit.

The first conventional receiving system comprises an antenna unit and the tuner-equipped head unit The antenna unit and the tuner-equipped head unit are connected to each other through an RF coaxial cable. The antenna unit comprises an antenna element and a low noise amplifier (LNA). The tuner-equipped head unit is equipped with a satellite radio tuner.

The second conventional receiving system comprises an antenna unit, the tuner-unequipped head unit, and a satellite radio receiver. The antenna unit and the satellite radio receiver are connected to each other through an RF coaxial cable. The satellite radio receiver and the tuner-unequipped head unit are connected to each other through a bus cable. The satellite radio receiver is equipped with a satellite radio tuner.

In addition, as a conventional antenna unit, a planar antenna may be used which is disclosed in Japanese Unexamined Patent Application Publication Tokkai No. 2001-24428 or JP-A2001-24428. According to JP-A 2001-24428, the planar antenna comprises an upper case, a planar antenna element disposed at backside of the upper case with regular intervals, a ground plate disposed at regular intervals from the planer antenna element, feeding leads disposed between the planer antenna element and the ground plate, a circuit board connected to a lower surface of the ground plate, and electronic parts mounted on the circuit board. The electronic parts include the above-mentioned low noise amplifier (LNA).

In the first conventional receiving system, in spite of an audience contract for the satellite radio broadcasting, it is necessary for a set maker to equip the head unit (the external device) with the satellite radio tuner on making a plan for a satellite radio tuner adapted model.

On the other hand, in the second conventional receiving system, the satellite radio receiver equipped with the satellite radio tuner is required in addition to the head unit (the external device) and further the bus cable for connecting between the head unit and the satellite radio receiver is required.

In addition, inasmuch as the RF coaxial cable has a gain loss, the RF coaxial cable is disadvantageous in that it is impossible to lengthen a cable's length thereof.

SUMMARY OF THE INVENTION

It is therefore an object of the present invention to provide an antenna unit and a receiving system which are not required to equip an external device with a satellite radio tuner in order to listen a satellite radio broadcasting.

It is another object of the present invention to provide an antenna unit and a receiving system wherein a satellite radio receiver is not required in order to listen a satellite radio broadcasting.

It is still another object of the present invention to provide a receiving system which is capable of lengthening a length of a cable for connecting between an antenna unit and an external device.

Other objects of this invention will become clear as the description proceeds.

On describing the gist of a first aspect of this invention, it is possible to be understood that an antenna unit comprises an antenna portion for receiving a satellite wave or a terrestrial wave to produce a received signal. According to the first aspect of this invention, the above-mentioned antenna unit further comprises a tuner portion for demodulating the received signal to produce a speech signal and an interface portion for converting the speech signal into an output signal for sending the speech signal to an external device. The interface portion comprises a speech/serial converting portion for converting the speech signal into a serial signal. The interface portion produces the serial signal as the output signal.

On describing the gist of a second aspect of this invention, it is possible to be understood that a receiving system comprises an antenna unit, an external device, and a serial bus for connecting the antenna unit and the external device. According to the second aspect of this invention, the antenna unit comprises an antenna portion for receiving a satellite wave or a terrestrial wave to produce a received signal, a tuner portion for demodulating the received signal to produce a speech signal, and an interface portion for converting the speech signal into an output signal for sending the speech signal to the external device. The interface portion comprises a speech/ serial converting portion for converting the speech signal into a serial signal. The interface portion produces the serial signal as the output signal. The external device comprises a serial/ speech converting portion for converting the serial signal, which is sent from the antenna unit through the serial bus, into the speech signal.

In the first and the second aspects of this invention, the antenna unit further may comprise a digital demodulating portion for converting the speech signal into a digital speech signal. In this event, the speech/serial converting portion converts the digital speech signal into the serial signal. The tuner portion may include a low noise amplifier for amplifying the received signal.

DESCRIPTION OF THE PREFERRED EMBODIMENT

Figure 1:
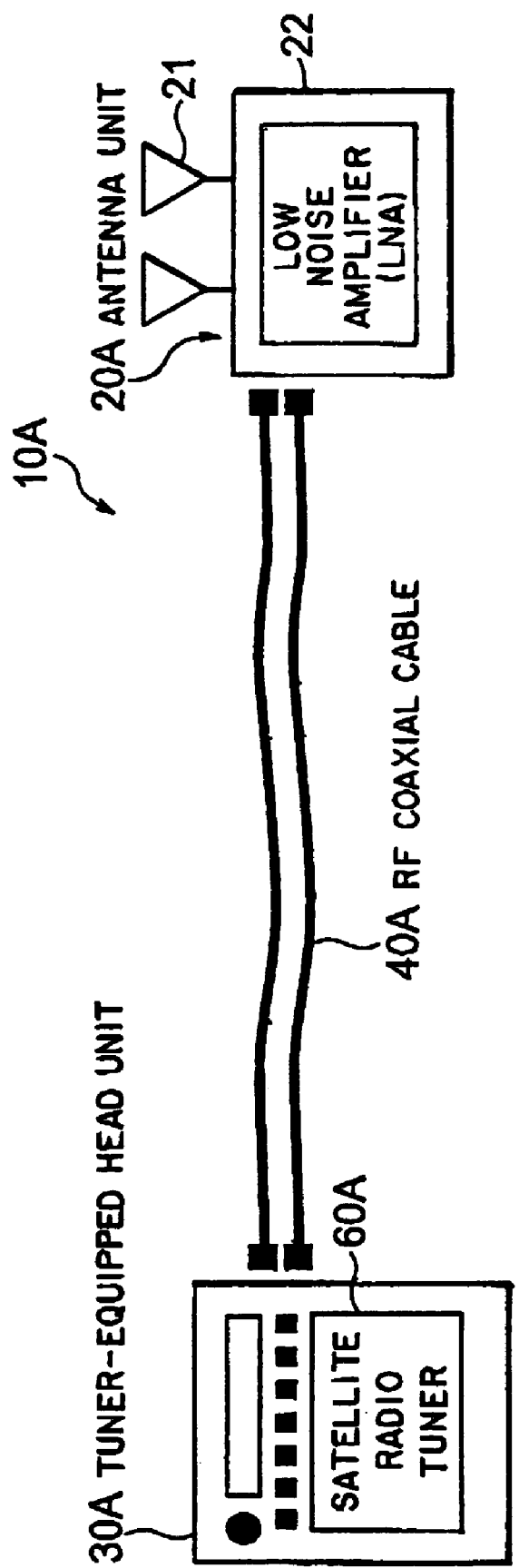
FIG. 1 is a block diagram showing a first conventional receiving system.
Figure 2:
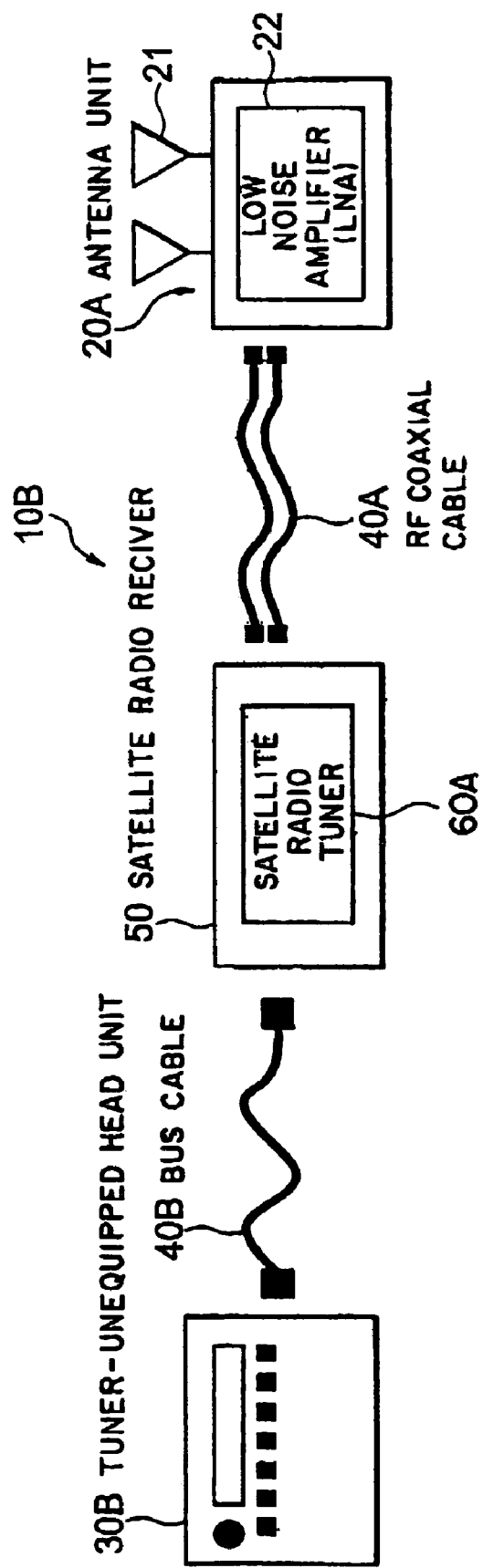
FIG. 2 is a block diagram showing a second conventional receiving system.

Referring to FIGS. 1 and 2, description will be at first directed to first and second conventional receiving systems 10A and 10B in order to facilitate an understanding of the present invention. FIG. 1 is a block diagram showing the first conventional receiving system 10A. FIG. 2 is a block diagram showing the second conventional receiving system 10B. The first conventional receiving system 10A illustrated in FIG. 1 uses, as a head unit, a tuner-equipped head unit 30A while the second conventional receiving unit 10B illustrated in FIG. 2 uses, as the head unit, a tuner-unequipped head unit 30B.

As shown in FIG. 1, the first conventional receiving system 10A comprises an antenna unit 20A and the tuner-equipped head unit 30A. The antenna unit 20A and the tuner-equipped head unit 30A are connected to each other through an RF coaxial cable 40A. The antenna unit 20A comprises antenna elements 21 and a low noise amplifier (LNA) 22. The tuner-equipped head unit 30A is equipped with a satellite radio tuner 60A.

As shown in FIG. 2, the second conventional receiving system 10B comprises the antenna unit 20A, the tuner-unequipped head unit 30B, and a satellite radio receiver 50. The antenna unit 20A and the satellite radio receiver 50 are connected to each other through the RF coaxial cable 40A. The satellite radio receiver 50 and the tuner-unequipped head unit 30B are connected to each other through a bus cable 40B. The satellite radio receiver 50 is equipped with the satellite radio tuner 60A.

In the first conventional receiving system 10A illustrated in FIG. 1, in spite of an audience contract for the satellite radio broadcasting, it is necessary for a set maker to equip the head unit (the external device) 30A with the satellite radio tuner 60A on making a plan for a satellite radio tuner adapted model.

On the other hand, in the second conventional receiving system 10B illustrated in FIG. 2, the satellite radio receiver 50 equipped with the satellite radio tuner 60A is required in addition to the head unit (the external device) 30B and further the bus cable 40B for connecting between the head unit 30B and the satellite radio receiver 50 is required.

In addition, inasmuch as the RF coaxial cable 40A has a gain loss, the RF coaxial cable 40A is disadvantageous in that it is impossible to lengthen a cable's length thereof.

Figure 3:
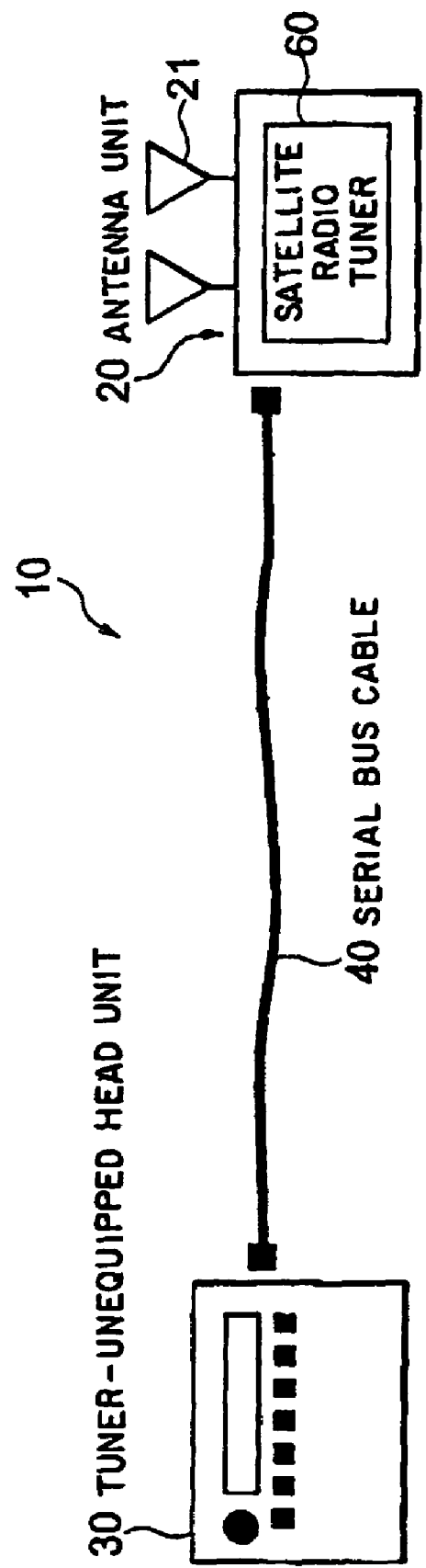
FIG. 3 is a block diagram showing a receiving system according to an embodiment of this invention.

Referring to FIG. 3, the description will proceed to a receiving system 10 according to an embodiment of this invention.

The illustrated receiving system 10 comprises an antenna unit 20 equipped with a satellite radio tuner 60, a tuner-unequipped head unit 30 serving as an external device. The antenna unit 20 and the tuner-unequipped head unit 30 are connected to each other through a serial bus cable 40. The antenna unit 20 includes an antenna element 21.

Figure 4:
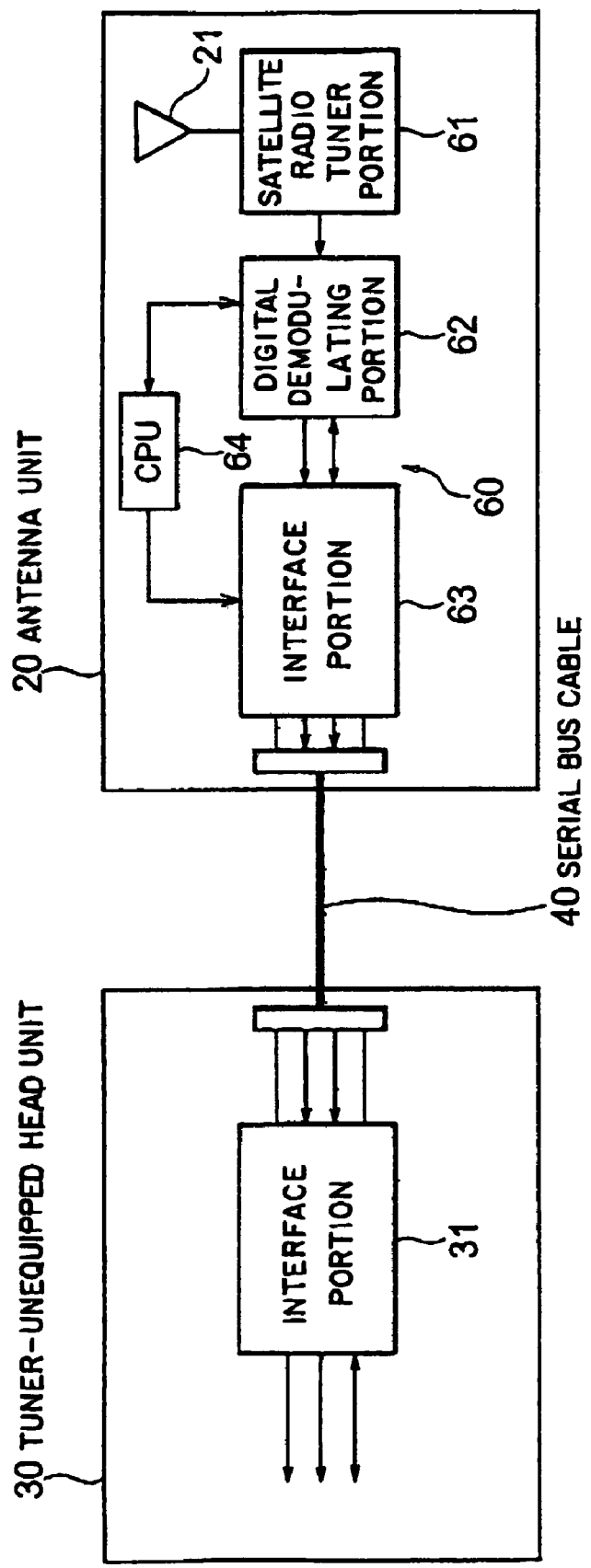
FIG. 4 is a block diagram showing structure of an antenna unit for use in the receiving system illustrated in FIG. 3.

Referring to FIG. 4 in addition to FIG. 3, the satellite radio tuner 60 equipped in the antenna unit 20 comprises a satellite radio tuner portion 61, a digital demodulating portion 62, an interface portion 63, and a central processing unit (CPU) 64.

The satellite radio tuner portion 61 demodulates the received signal received by the antenna elements 21 to produce an speech signal. The speech signal is supplied to the digital demodulating portion 62. The digital demodulating portion 62 converts or demodulates the speech signal into a digital speech signal which is supplied to the interface portion 63. The interface portion 63 converts the digital speech signal into an output signal for sending to the head unit 30 acting as the external device. The interface portion 63 serves as a speech/serial converting portion for converting the digital speech signal into a serial signal as the output signal. The serial signal is sent to the head unit 30 through the serial bus cable 40. The CPU 64 controls the digital demodulating portion 62 and the interface portion 63.

On the other hand, the head unit 30 includes an interface portion 31 for receiving the serial signal sent from the antenna unit 20 through the serial bus cable 40. The interface portion 31 serves as a serial/speech converting portion for converting the received serial signal into the speech signal.

In the manner which is described above, in this embodiment of the present invention, the speech signal is converted into the serial signal at the side of the antenna unit 20 and the serial signal is converted into the speech signal at the side of the head unit 30.

With this structure, a user can cheaply buy the head unit 30 adapted for a satellite radio. After determining audience of the satellite radio broadcasting, the user can easily listen the satellite radio broadcasting by using the antenna unit 20 in question. In addition, inasmuch as transmission/reception of data between the antenna unit 20 and the head unit 30 is carried out through the serial bus cable 40, it is unnecessary to take account of the gain loss in the RF coaxial cable 40A in prior art. It is therefore possible to lengthen a length of the serial bus cable 40.

Referring to FIGS. 5 through 9, the description will proceed to structure of the antenna unit 20. The illustrated antenna unit 20 comprises a planar antenna. The antenna unit 20 comprises a planar antenna element 21 which consists of a rectangular metal plate. A circuit board 23 is disposed in parallel to the planar antenna element 21 with a predetermined interval left therebetween. The circuit board 23 has an upper surface 23a on which a ground pattern (which will later be described) is formed. Between the planar antenna element 21 and the circuit board 23, a feeding lead 24 is disposed.

Figure 9:
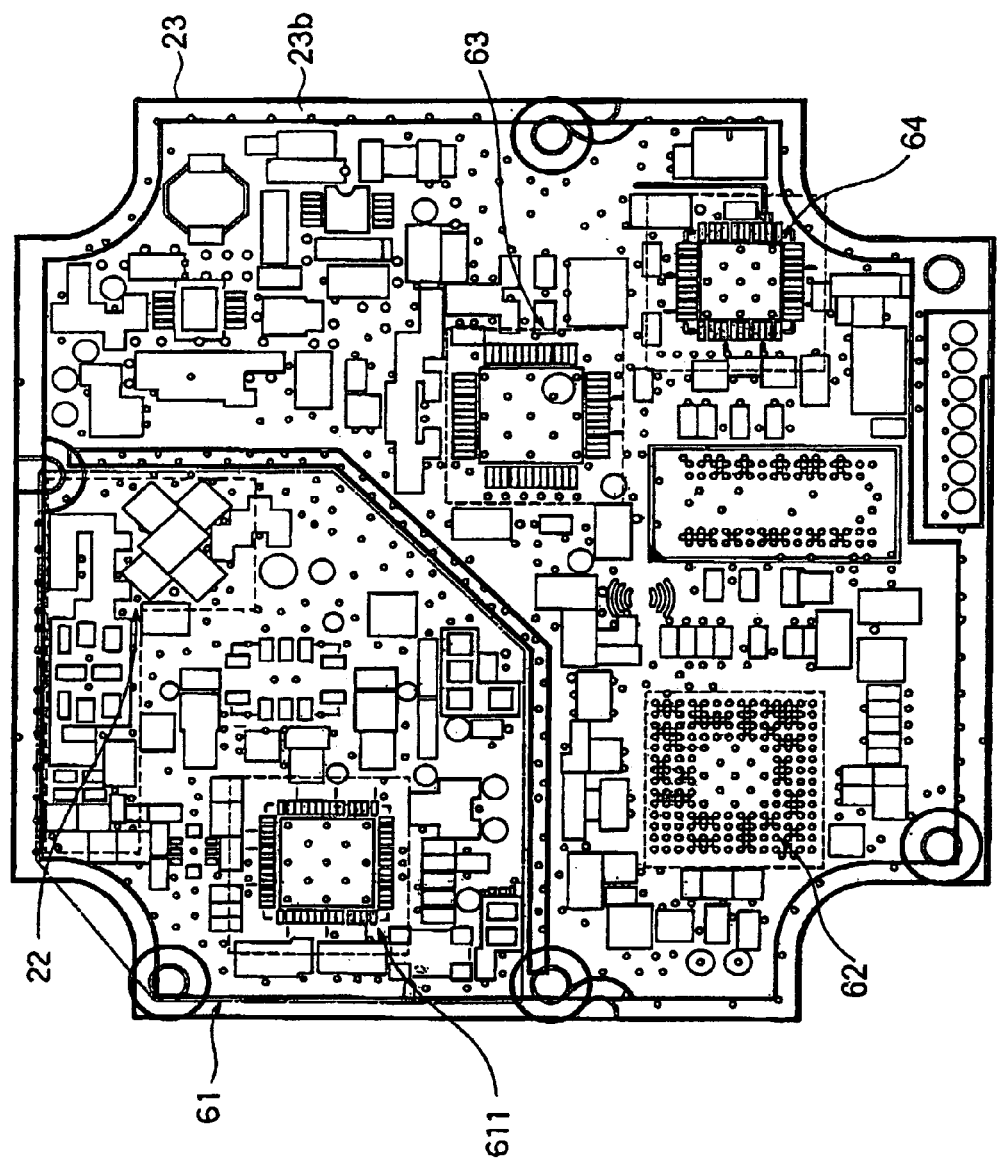
FIG. 9 is a plan view showing various electronic parts mounted on a bottom surface (a rear surface) of a circuit board for use in the antenna unit illustrated in FIG. 5.

Referring to FIG. 9, the circuit board 23 has a rear surface (a bottom surface) 23b on which various electronic parts are disposed. The various electronic parts include the satellite radio tuner portion 61, the digital demodulating portion 62, the interface portion 63, and the CPU 64 which are described above. The digital demodulating portion 62 comprises a base band integrated circuit (IC). The interface portion 63 comprises an interface chip. The satellite radio tuner portion 61 includes a low noise amplifier (LNA) 22 and a tuner integrated circuit (IC) 611.

Figure 5:
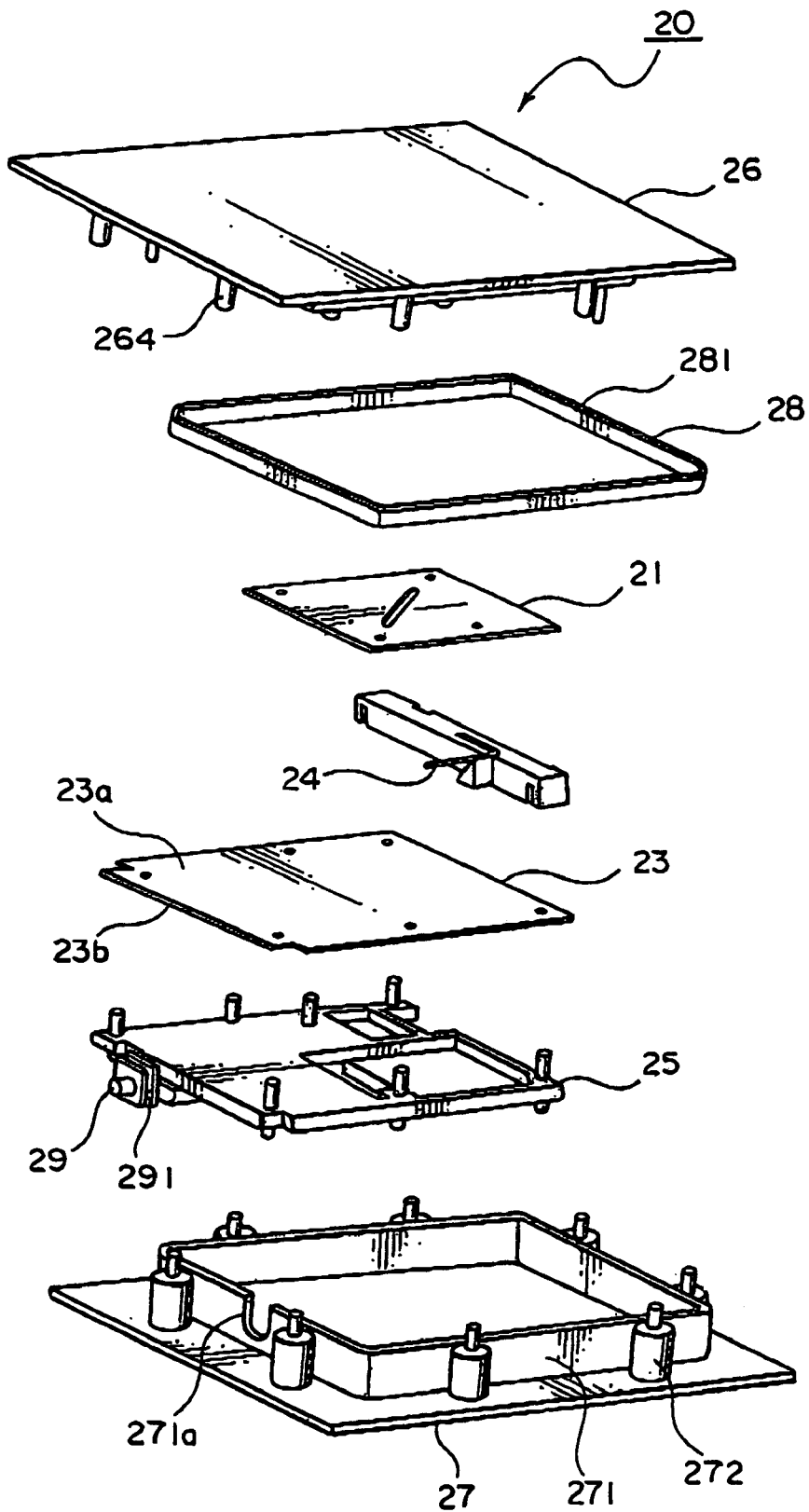
FIG. 5 is an exploded perspective view the antenna unit for use in the receiving system illustrate in FIG. 3.
Figure 6:
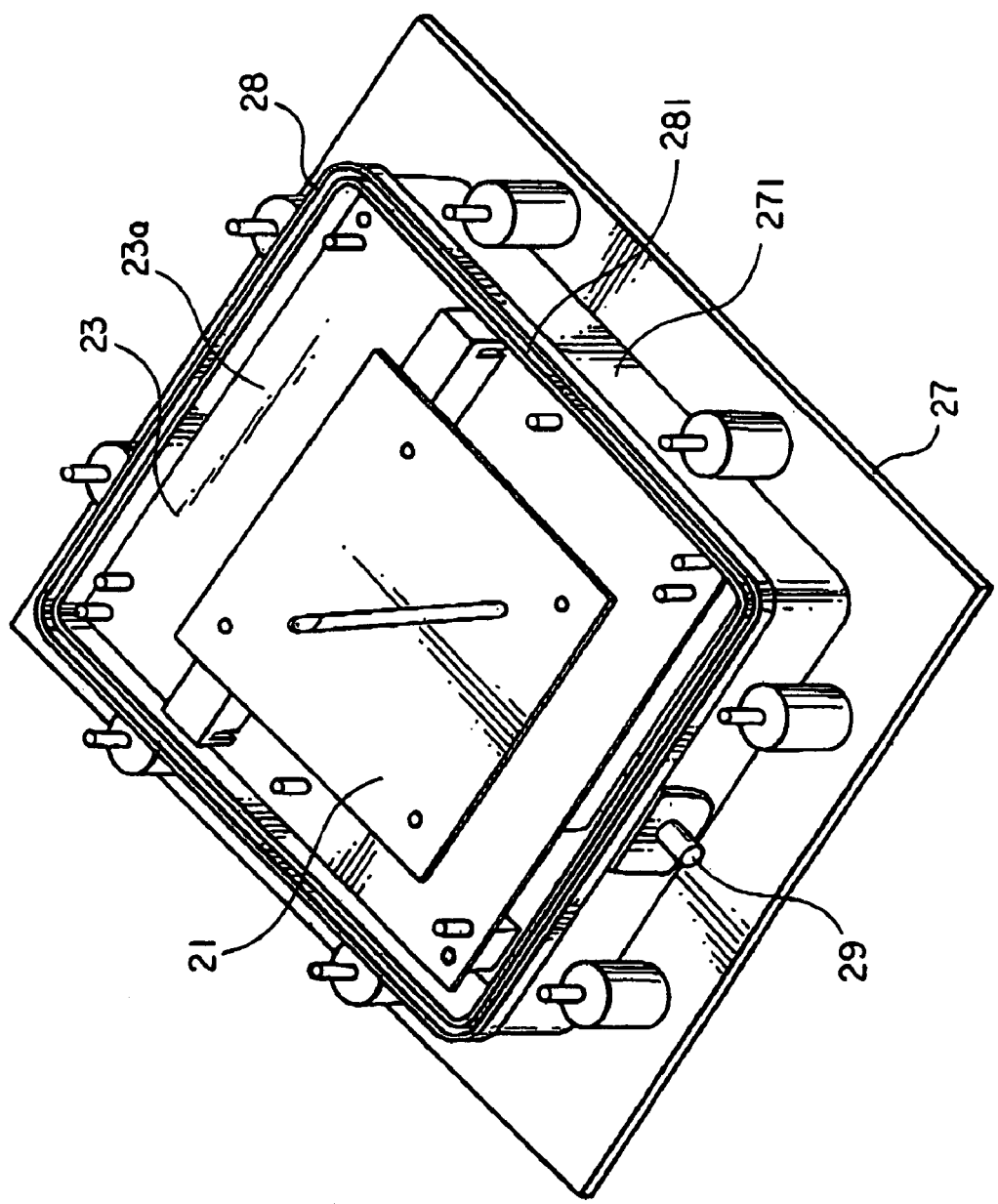
FIG. 6 is an assembled perspective view of the antenna unit illustrated in FIG. 5 with an upper case removed.
Figure 7:
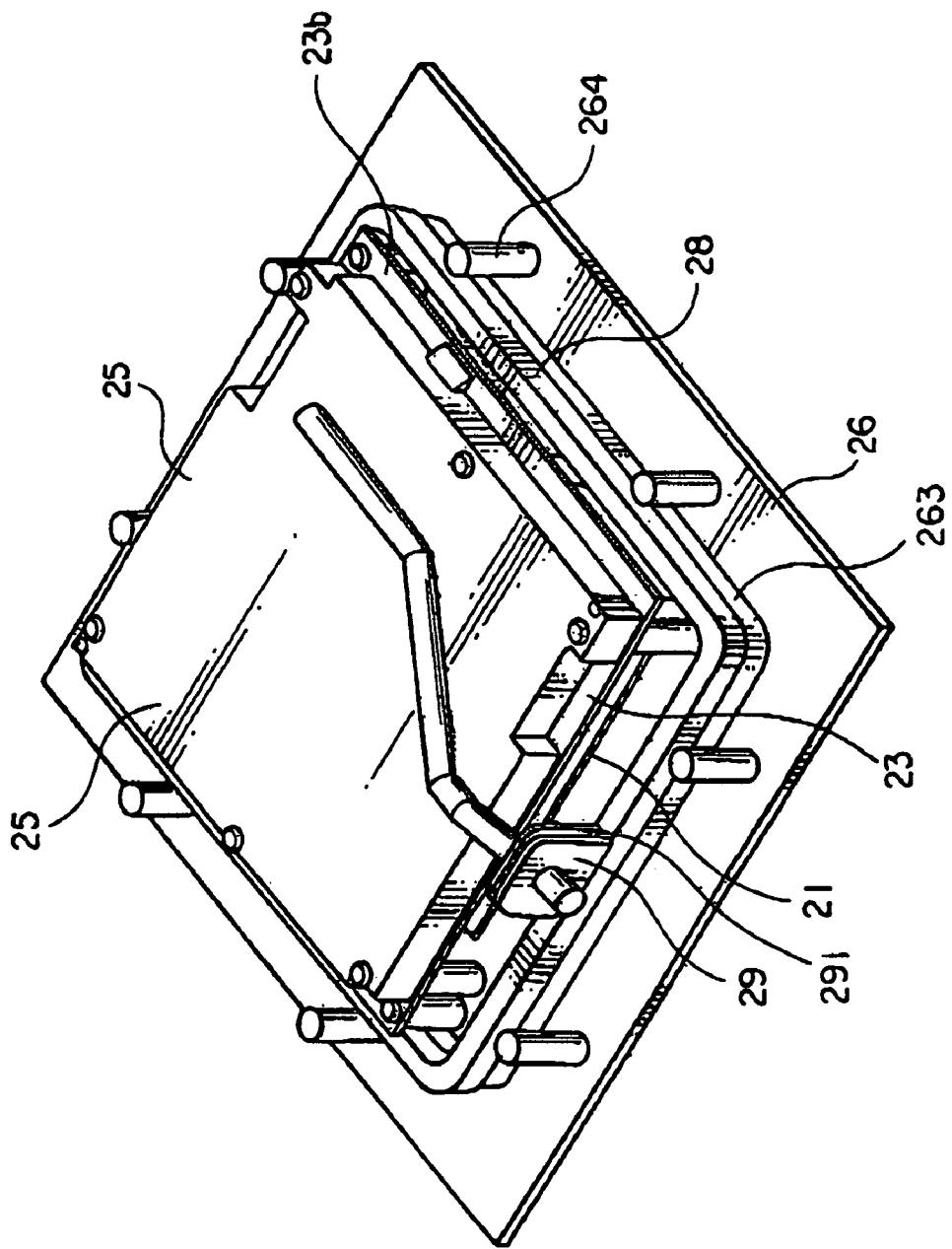
FIG. 7 is an assembled perspective view of the antenna unit illustrated in FIG. 5 with a lower case removed.

As shown in FIG. 5, the various electronic parts are covered with a metal cover 25 for electromagnetic shielding. The above-mentioned components are accommodated in a case which comprises an upper case 26 and a lower case 27. In addition, a reference symbol of 28 represents a packing and a reference symbol of 29 represents a cable and bushing.

Figure 8:
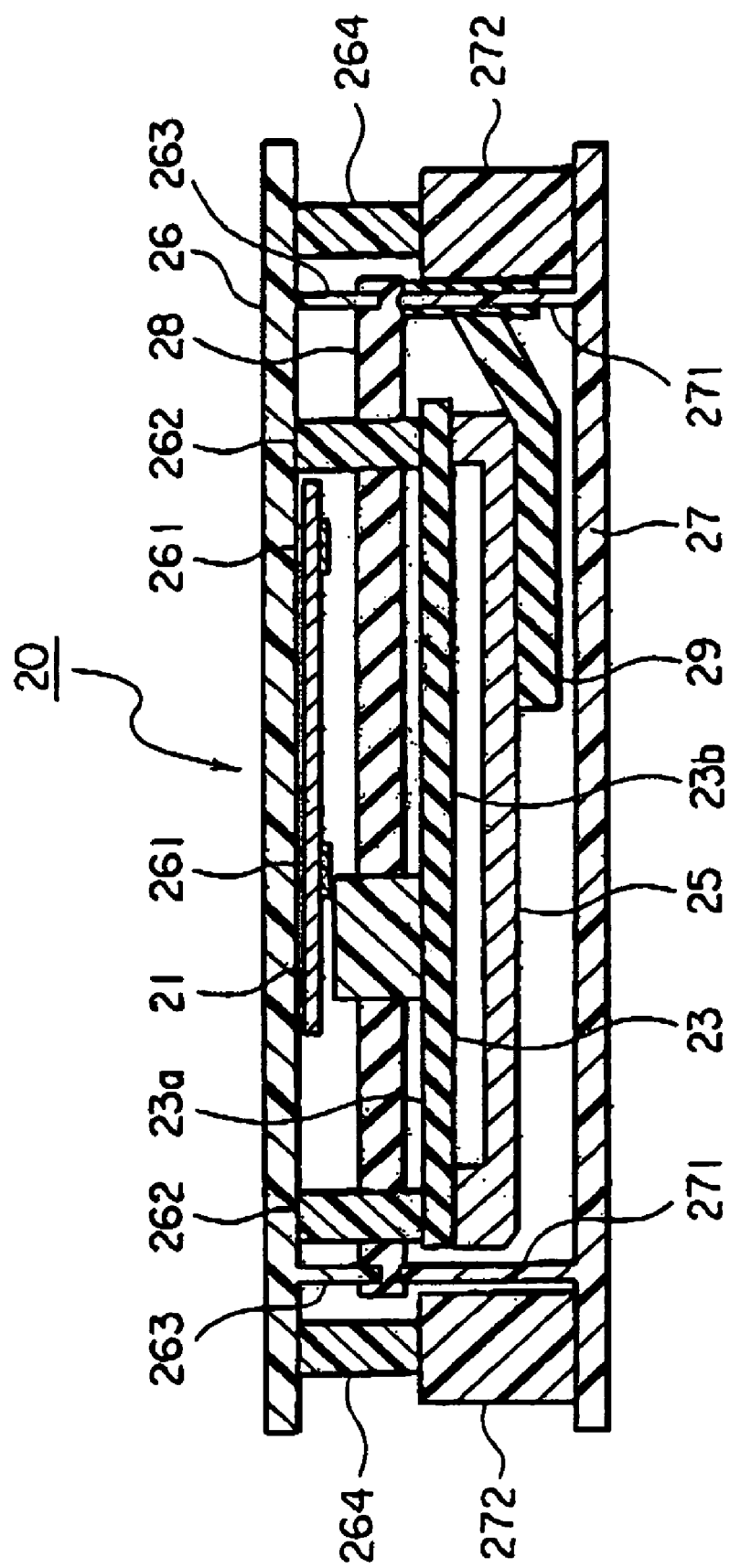
FIG. 8 is a sectional view of the antenna unit illustrated in FIG. 5.

As shown in FIG. 8, the upper case 26 has four inner protrusions 261 which integrally protrude therefrom, whereby the upper case 26 and the antenna element 21 are positioned. By welding tips of the inner protrusions 261, the antenna element 21 is fixed to the upper case 26.

The upper case 26 has four outer protrusions 262 which integrally protrude therefrom. The circuit board 23 is screwed to the four outer protrusions 262 so that a distance between the antenna element 21 and the circuit board 23 in a height direction is positioned.

The packing 28 has a ring-shaped groove 281. The upper case 26 has a ring-shaped wall portion which is integrally formed to the upper case 26 and which projects so as to surround the antenna element 21. The lower case 27 has an inner wall on which a ring-shaped wall portion 271 is integrally formed. The packing 28 is mounted on the upper case 26 by inserting the ring-shaped wall portion 263 in the ring-shaped groove 281 and by crushing the packing 28 between the ring-shaped wall portion 263 and the ring-shaped wall portion 271 to form a water-proof structure.

The upper case 26 has eight columned members 264 which are integrally formed thereto around the ring-shaped wall portion 263. The lower case 27 has eight columned members 272 at positions corresponding to the eight columned members 264. By screwing the eight columned members 264 and the eight columned members 272, the upper case 26 and the lower case 27 are fixed to each other.

As shown in FIG. 5, the ring-shaped wall portion 271 of the lower case 27 has a U-shaped notch 271a in which a bushing of the cable and bushing 29 is press-fitted. The bushing of the cable and bushing 29 has a U-shaped groove 291 in which an edge of the U-shaped notch 271a of the lower case 27 is inserted. Therefore, the packing 28 is crushed at an upper surface of the bushing to form a water-proof structure.

Figure 10:
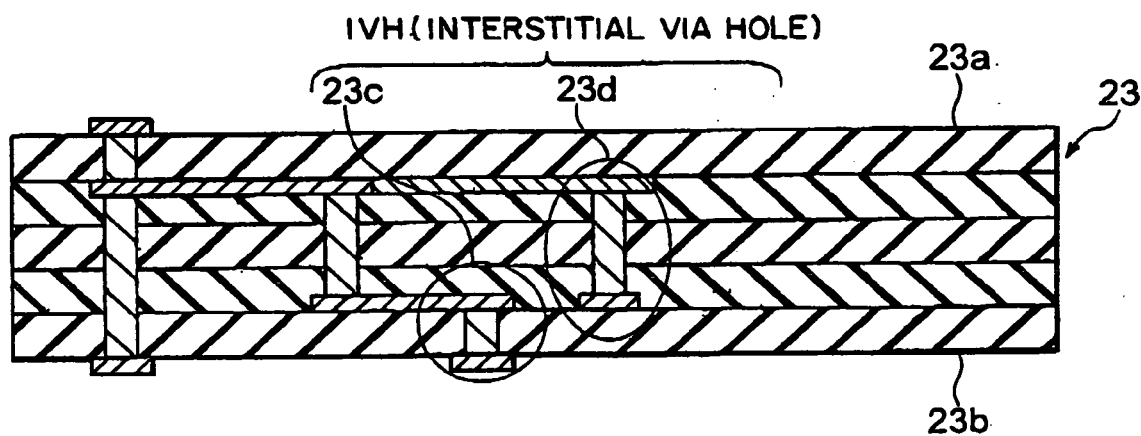
FIG. 10 is a sectional view of the circuit board illustrated in FIG. 9.

FIG. 10 shows the circuit board 23 for use in the antenna unit 20 according to this embodiment of the present invention. The illustrated circuit board 23 comprises a circuit board in which interstitial via holes (IVHs) are formed. The IVHs comprise blind via 23c and buried via 23d. Therefore, the circuit board 23 has the upper surface 23a on which no conducting hole is formed.

Figure 11:
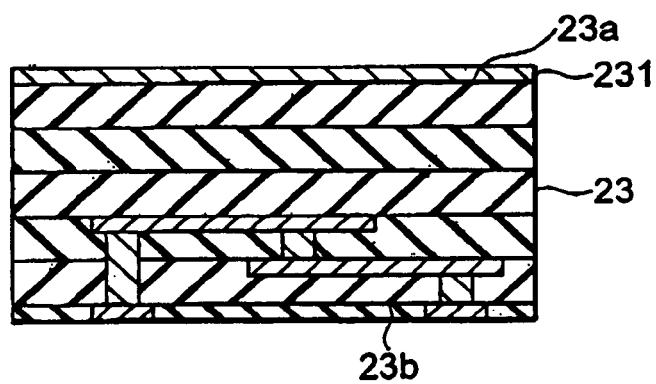
FIG. 11 is a sectional view showing the circuit board illustrated in FIG. 10 and a ground pattern formed on an upper surface thereof.

As a result, as shown in FIG. 11, it is possible to form the ground pattern 231 for antenna radiation on a total surface of the upper surface 23a of the circuit board 23.

Figure 12:
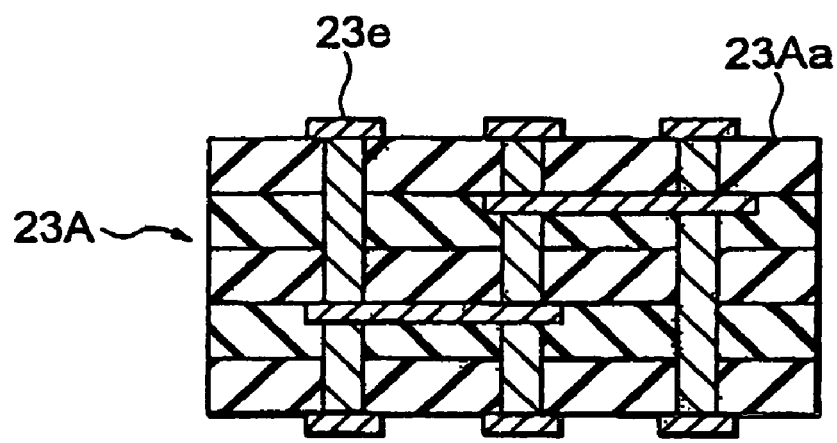
FIG. 12 is a sectional view of a circuit board for use in a conventional antenna unit.
Figure 13:
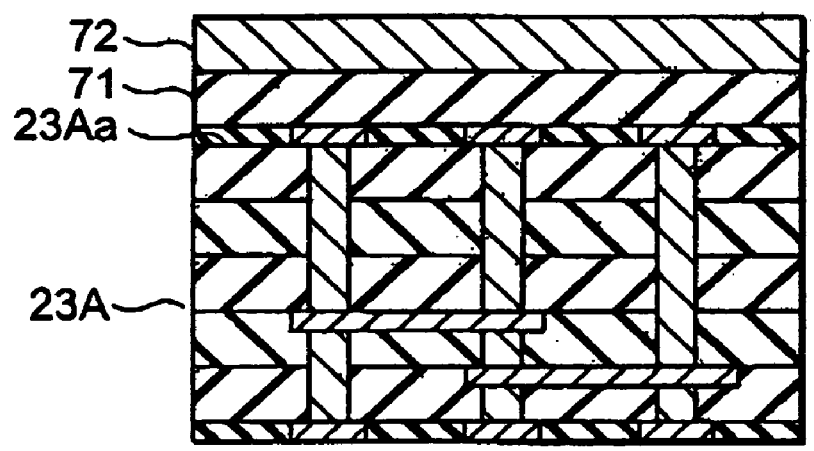
FIG. 13 is a sectional view showing the circuit board illustrated in FIG. 12, an insulating sheet and a ground plate for antenna radiation formed on an upper surface thereof.

On the other hand, as shown in FIG. 12, a circuit board 23A, in which thru holes are formed, has an upper surface 23Aa on which conducting holes are formed. It is therefore impossible to form a ground pattern on the upper surface 23Aa of the circuit board 23A. As a result, in the circuit board 23A in which the thru holes are formed, as shown in FIG. 13, it is necessary to provide with a ground plate 72 for antenna radiation through an insulating sheet on the upper surface 23Aa.

In other words, it is possible to obtain equivalent characteristic by using, as a circuit board, the circuit board 23 in which the IVHs are formed without using the ground plate 72 for antenna radiation and the insulating sheet 71. In the manner which is described above, by forming the ground pattern 231 on the total surface of the upper surface 23a of the circuit board 23, the insulating sheet 71 and the ground plate 72 for antenna radiation are unnecessary, it is possible to result in cost-reduction and miniaturization of the antenna unit 20.

While this invention has thus far been described in conjunction with a preferred embodiment thereof, it will now readily possible for those skilled in the art to put this invention into various manners. For example, the antenna unit according to this invention may be used in many fields such as vehicle-mounted appliances, consumer appliances, portable devices, game machines, personal computers, or the like. In addition, it is possible to listen satellite radio broadcasting in any device which is not adapted to satellite radio by using a display controller.

What is claimed is:

1. An antenna unit for a receiving system to listen to a satellite radio broadcast, said antenna unit comprising:

an antenna portion for receiving a satellite wave or a terrestrial wave to produce a received signal;

a circuit board disposed in parallel to said antenna portion which is apart from an upper surface of the circuit board at a predetermined interval;

a tuner portion disposed on a rear surface of said circuit board for demodulating the received signal to produce a speech signal;

a digital demodulating portion disposed on the rear surface of said circuit board for converting the speech signal into a digital speech signal;

an interface portion disposed on the rear surface of said circuit board for converting the digital speech signal into an output signal for sending the digital speech signal to an external device via a serial bus, wherein said interface portion comprises a speech/serial converting portion for converting the digital speech signal into a serial signal, and said interface portion produces the serial signal as the output signal; and a case for accommodating said antenna portion, said circuit board, said tuner portion, said digital demodulating portion, and said interface portion therein.

2. The antenna unit as claimed in claim 1, wherein said tuner portion includes a low noise amplifier for amplifying the received signal.

3. A receiving system to listen to a satellite radio broadcast, said receiving system comprising:
- an antenna unit;
- an external device; and
- a serial bus for connecting the antenna unit and the external device, wherein said antenna unit comprises:
  - an antenna portion for receiving a satellite wave or a terrestrial wave to produce a received signal;
  - a circuit board disposed in parallel to said antenna portion which is apart from an upper surface of the circuit board at a predetermined interval;
  - a tuner portion disposed on a rear surface of said circuit board for demodulating the received signal to produce a speech signal;
  - a digital demodulating portion disposed on the rear surface of said circuit board for converting the speech signal into a digital speech signal;
  - an interface portion disposed on the rear surface of said circuit board for converting the digital speech signal into an output signal for sending the speech signal to said external device, wherein said interface portion comprises a speech/serial converting portion for converting the digital speech signal into a serial signal, and said interface portion produces the serial signal as the output signal; and
- a case for accommodating said antenna portion, said circuit board, said tuner portion, said digital demodulating portion, and said interface portion therein, and
- wherein said external device comprises a serial/speech converting portion for converting said serial signal, which is sent from said antenna unit through said serial bus, into the speech signal.

4. The receiving system as claimed in claim 3, wherein said tuner portion includes a low noise amplifier for amplifying the received signal.

* * * * *

UNITED STATES PATENT AND TRADEMARK OFFICE
CERTIFICATE OF CORRECTION

PATENT NO. : 7,570,915 B2
APPLICATION NO. : 11/214491
DATED : August 4, 2009
INVENTOR(S) : Takeo Watanabe et al.

It is certified that error appears in the above-identified patent and that said Letters Patent is hereby corrected as shown below:

Title Page, column 1, insert below (65) Prior Publication Data the following:

--(30) Foreign Application Priority Data
Jan. 28, 2005   (JP) ................... 2005-20537--.

Signed and Sealed this

Twenty-seventh Day of October, 2009

David J. Kappos
*Director of the United States Patent and Trademark Office*